United States Patent [19]

Carlton

[11] 4,441,432
[45] Apr. 10, 1984

[54] TILTING TABLE
[75] Inventor: Charles D. Carlton, Conway, Ark.
[73] Assignee: Tiffany Industries, Inc., St. Louis, Mo.
[21] Appl. No.: 259,552
[22] Filed: May 1, 1981
[51] Int. Cl.³ .............................................. A47F 5/12
[52] U.S. Cl. ...................................... 108/5; 108/139; 108/140; 248/454; 248/456; 312/313
[58] Field of Search ................... 108/4, 5, 1, 139, 140, 108/138; 312/231, 233, 313; 248/454, 456, 457, 419, 420, 178, 185, 395, 394

[56] References Cited
U.S. PATENT DOCUMENTS

| 668,038 | 2/1901 | Duhamel | 108/4 |
| 1,188,792 | 6/1916 | Kormeday | 108/5 |
| 2,689,157 | 9/1954 | Di Censo | 108/5 |
| 4,365,561 | 12/1982 | Tellier et al. | 108/32 X |

FOREIGN PATENT DOCUMENTS

| 11595 | 3/1910 | France | 108/5 |
| 1305757 | 8/1962 | France | 108/4 |

Primary Examiner—James T. McCall
Attorney, Agent, or Firm—Cohn, Powell & Hind

[57] ABSTRACT

A tilting table includes a table top attached to an upper U-shaped bracket. A lower U-shaped bracket is rotatively attached by a bearing to a base. The lower U-shaped bracket includes a pair of opposed side, substantially horizontal slots and a pair of opposed side angle slots. The angle slots include a plurality of notches. Pins are slidably received in the slots, and are carried by the upper bracket for supporting the table top. The pins are selectively positioned in the notches of the angle slots, while the pins slidably move in the substantially horizontal slots for selectively inclining the table top.

10 Claims, 5 Drawing Figures

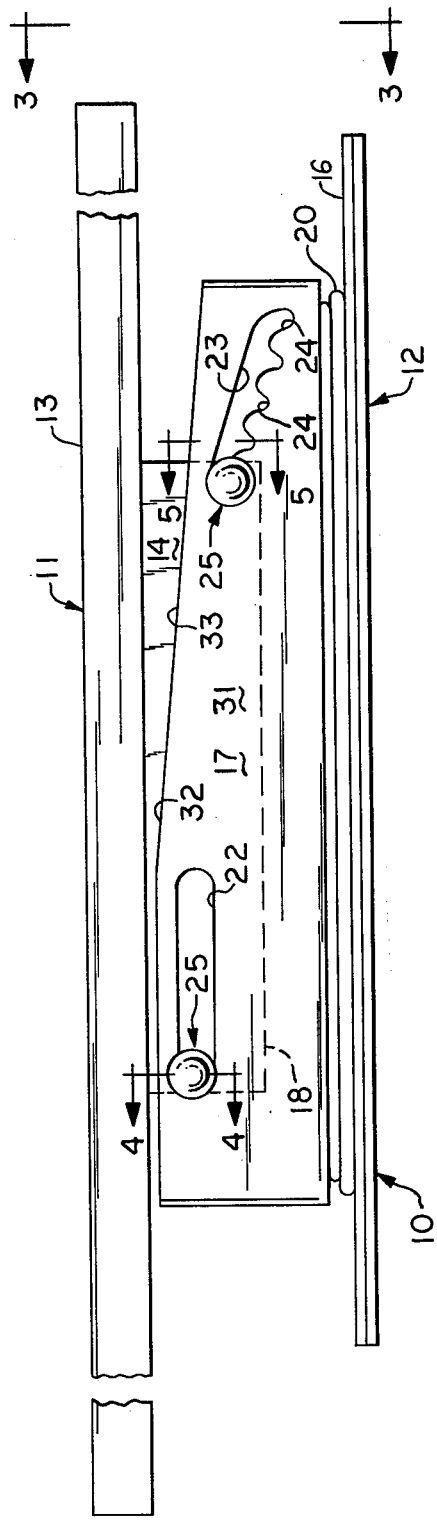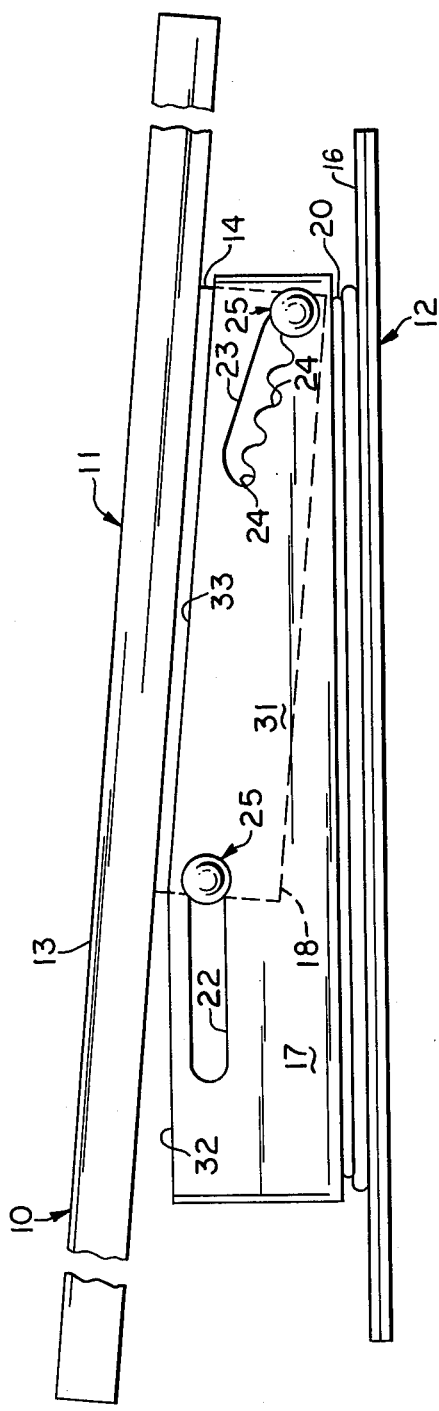

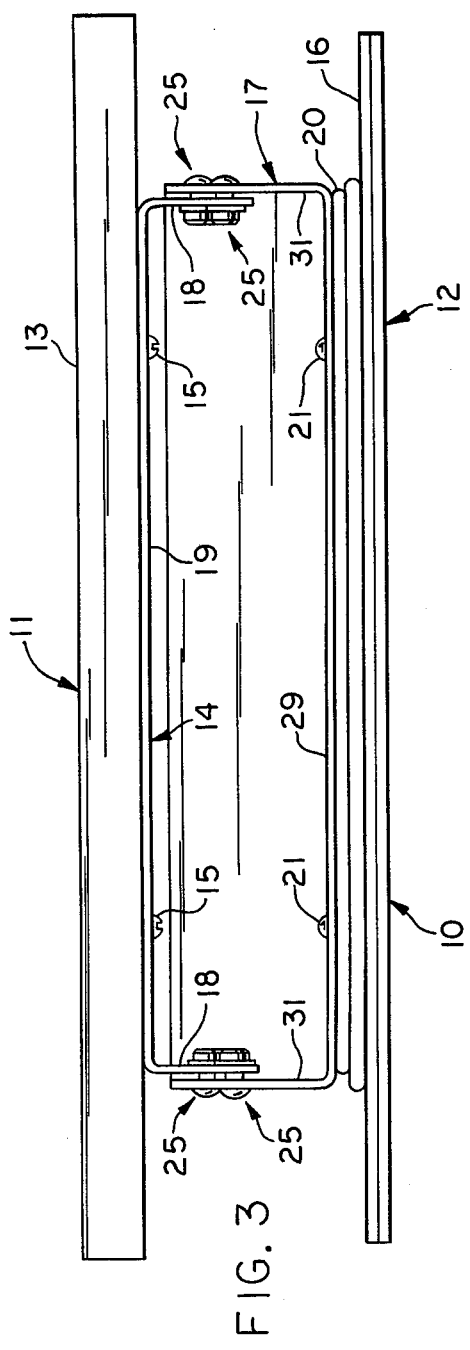
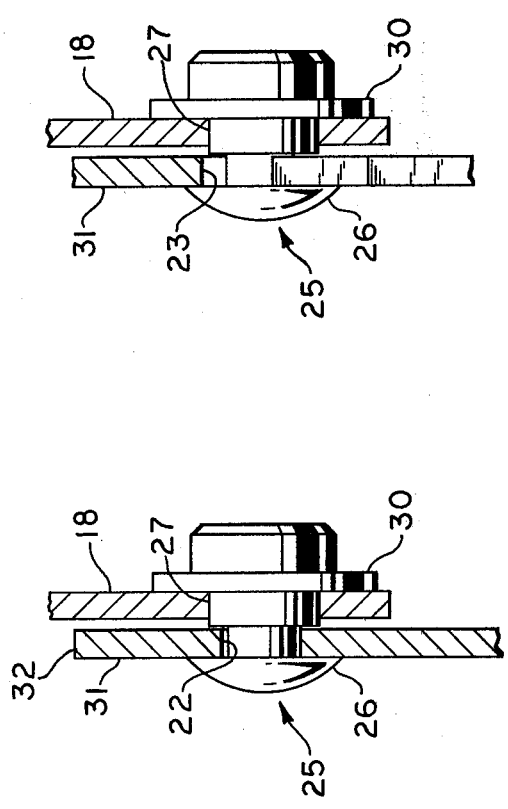
FIG. 3
FIG. 4
FIG. 5

TILTING TABLE

BACKGROUND OF THE INVENTION

This invention relates generally to a table, and particularly to a table having a top which is capable of being tilted to a predetermined angle and being rotated.

Traditionally tables and desks have tops which are fixed and cannot be tilted without tilting the entire table or desk. When using computer terminals, particularly CRT (cathode ray tube) terminals which have a television-like screen, light glare on the face of the screen often times makes it difficult to read the information from the screen.

It is therefore desirable to be able to readily both rotate and tilt the CRT terminal to a position at which glare is minimized. Many applications of CRT terminals include office settings where fixed overhead lighting is utilized. In such a circumstance, it is often possible to minimize glare from overhead lighting on the face of the terminal by tilting the terminal at angles not greater than five degrees. Such tilting is not readily achievable using a traditional table or desk.

It is also desirable to be able to easily rotate such equipment to a desired position for more convenient operation. On a traditional table or desk, the equipment must normally be moved relative to the table top. Such moving requires either the physical lifting or turning of the equipment or the table. A table having a rotatable top facilitates such turning.

SUMMARY OF THE INVENTION

This tilting table provides a table top which is readily rotatable and tiltable for adjusting the angle of equipment placed on the table top such as CRT terminals, for minimizing glare.

The tilting table includes table top means supported by base support means. One of the means includes a pair of opposed side substantially horizontal slots. Further, one of the means includes a pair of opposed side angle slots. Opposed side pin means are carried by the others of said means, and engage in bearing relation the first said one means in the substantially horizontal slots, and engage in bearing relation the second said one means in the angle slots for supporting the table top means.

In one aspect of the invention, the angle slots include a margin having a plurality of notches. The pin means selectively engage the notches, while the pin means slidably move in the substantially horizontal slots, for retaining the table top means in a preselected position.

In another aspect of the invention, the base support means includes a U-shaped lower bracket having substantially upstanding side walls. The pairs of opposed side slots are contained in the side walls of the lower bracket.

In yet another aspect of the invention, the table top means includes a table top and a U-shaped upper bracket having depending sidewalls. The pins are carried by the side walls of the upper bracket.

In one aspect, the upper bracket is received within the lower bracket. The pins extend through the slots in the sidewalls of the lower bracket, and are carried by the sidewalls of the upper bracket.

In still another aspect of the invention, the base support means includes a base, the lower bracket being rotatively connected to the base. A "lazy susan" type, rotative bearing interconnects the base and the lower bracket. The lower bracket includes sidewalls with upper margins having portions tapered in the same general direction as the angle slots.

BRIEF DESCRIPTION OF THE DRAWINGS

FIG. 1 is a side elevational view of the tilting table showing the table top in a horizontal position;

FIG. 2 is a side elevational view of the tilting table showing the table top in a fully tilted position;

FIG. 3 is a front elevational view of the tilting table;

FIG. 4 is an enlarged, fragmentary sectional view taken on line 4—4 of FIG. 1, and FIG. 5 is an enlarged, fragmentary sectional view taken on line 5—5 of FIG. 1.

DESCRIPTION OF THE PREFERRED EMBODIMENT

Referring now by characters of reference to the drawings, and first to FIGS. 1 and 3, it will be understood that the tilting table generally indicated by 10 includes a table top means that is indicated generally by 11, and a base support means that is indicated generally by 12.

The table top means 11 includes a table top 13 and an U-shaped upper bracket 14 having depending sidewalls 18 and interconnecting web 19. Screws 15 attach the web 19 of the upper bracket 14 to the bottom side of the table top 13.

The base support means 12 includes a horizontal base 16 which in the preferred embodiment is designed to be placed on a table or desk (not shown). A lower U-shaped bracket 17 has upstanding sidewalls 31 and an interconnecting web 29, the web 29 being connected to a "lazy susan" type rotative bearing 20 as by rivets 21. The bearing 20 is a conventional bearing of the type having a raceway containing a plurality of ball bearings, such as is manufactured by the Triangle Manufacturing Company, Model No. 12CN "Lazy Susan" bearing. The bearing 20 is attached to the base 16 in a manner such that the lower bracket 17 can be rotated relative to the base 16. One of the brackets 14 or 17, which in the preferred embodiment comprises the lower bracket 17, includes a pair of opposed side substantially horizontal slots 22 in its sidewalls. One of the brackets 14 or 17, which in the preferred embodiment comprises the lower bracket 17, includes a pair of opposed side angle slots 23 in its sidewalls. The angle slots 23 include a plurality of spaced notches 24 on their lower margin. Opposed side pin means, indicated generally by 25, are carried by the other of the respective brackets 14 and 17, which in the preferred embodiment is the upper bracket 14.

As is most clearly seen in FIGS. 4 and 5, the pin means 25 includes a rivet 26 which passes through a bushing 27 and washer 30. The pin means 25 slidably engages the sidewalls 31 of the lower bracket 17 in the slots 22 and 23, and is carried by the sidewalls 18 of the upper bracket 14. The pin means 25 engages preselected notches 24 of the angle slots 23, as the pin means 25 slidably moves in the slots 22, for determining the angle of inclination or tilting of the table top 13.

The opposed sidewalls 31 of the lower bracket 17 has upper margins 32. The upper margins 32 include portions 33 which are tapered in the same general direction as the angle slots 23. The tapered portion 33 provides clearance for the table top 13 when the table top 13 is in an inclined position such as indicated in FIG. 2. In the preferred embodiment the taper is the same angle as the table top 13 when it is fully inclined.

It is thought that the structural features and functional advantages of the tilting table have become fully apparent from the foregoing description of parts, but for completeness of disclosure a brief description of the operation of the table will be given.

The tilting table 10 is particularly useful for holding a CRT terminal. Of course, it is understood that the tilting table 10 can be used whenever it is desired to have a table which will tilt and/or rotate. Supporting of CRT terminals is one particular application of the table. In use, the tilting table 10 would normally be placed upon a flat table or desk (not shown). A CRT terminal (not shown) would be placed on top of the tilting table 10. The tilting table top 13 is readily manually rotatable relative to the base 16 as it is carried by the bearing 20. To rotate the table 10, the table top 13 can be grasped and manually turned to the desired position. This rotation allows the CRT terminal to be rotated to a desired position.

In order to minimize glare on the screen of the CRT terminal, the table top 13 is readily tiltable. In order to tilt the table top 13 from the horizontal position shown in FIG. 1, the front of the table top 13 is lifted slightly to remove the pins means 25 from the notches 24 of the angle slots 23 which they presently occupy. The table top 13 is then pulled forward relative to the base 16. As the table top 13 is pulled generally forward, the pin means 25 in the substantially horizontal slots 22 move forward, while the pin means 25 in the angle slots 23 are moved in a generally forward and slightly downward direction. The pin means 25 can be positioned in any of the notches 24 as is desired for proper adjustment of the angle of the table top 13, and consequently of the CRT terminal. Of course, to move the table top 13 to a more horizontal position the operation is reversed. The table top 13 is moved in a generally rearward direction while slightly raising the front of the table top 13.

It is readily apparent that the tilting table 10 could be constructed in a manner to provide any desired angle of tilt. In the preferred embodiment, the tilting fully tilted position of the table top 13 indicated in FIG. 2 is approximately five degrees from horizontal. The adjustment of the table top 13 to angles varying from zero to five degrees is generally sufficient in order to minimize glare on a CRT terminal.

I claim as my invention:

1. A tilting table comprising:
  (a) table top means,
  (b) base support means for supporting the table top means,
  (c) one of said means including a pair of opposed side substantially horizontal slots,
  (d) one of said means including a pair of opposed side angle slots,
  (e) opposed side pin means carried by the others of said means, and engaging in bearing relation the first said one means in the substantially horizontal slots and engaging in bearing relation the second said one means in the angle slots for interconnecting the table top means and for supporting the table top means,
  (f) the angle slots including lower margins having a plurality of spaced notches, and
  (g) said opposed side pin means including pins selectively engaging the lower margin notches for retaining the table top means in a pre-selected tilted position.

2. A tilting table as defined in claim 1, in which:
  (h) the opposed side pin means is carried by the table top means, and
  (i) the slots are provided in the base support means.

3. A tilting table as defined in claim 1, in which:
  (h) the base support means includes a U-shaped lower bracket, the pairs of opposed side slots are contained in the lower bracket.

4. A tilting table as defined in claim 3, in which:
  (i) the table top means includes:
    (1) a table top, and
    (2) a U-shaped upper bracket, the pin means is carried by the upper bracket.

5. A tilting table as defined in claim 4, in which:
  (j) the base support means includes:
    (1) a base, and
    (2) a bearing, the bearing rotatively supporting the lower bracket on the base for selectively rotating the table top.

6. A tilting table comprising:
  (a) table top means,
  (b) base support means for supporting the table top means,
  (c) one of said means including a pair of opposed side substantially horizontal slots,
  (d) one of said means including a pair of opposed side angle slots,
  (e) opposed side pin means carried by the others of said means, and engaging in bearing relation the first said one means in the substantially horizontal slots and engaging in bearing relation the second said one means in the angle slots for interconnecting the table top means and for supporting the table top means,
  (f) the angle slots having a margin including a plurality of spaced notches,
  (g) said opposed side pin means including pins selectively engaging the notches for retaining the table top means in a pre-selected tilted position,
  (h) the base support means including a U-shaped lower bracket, the pairs of opposed side slots are contained in the lower bracket,
  (i) the table top means including:
    (1) a table top, and
    (2) a U-shaped upper bracket, the pin means is carried by the upper bracket,
  (j) the base support means including:
    (1) a base, and
    (2) a bearing, the bearing rotatively supporting the lower bracket on the base for selectively rotating the table top, and
  (k) the upper bracket being received within the lower bracket, the pin means slidably extending through the respective slots in the lower bracket, and being carried by the upper bracket.

7. A tilting table as defined in claim 6, in which:
  (l) the lower bracket includes side portions with upper margins having portions tapered in the same general direction as the angle slots.

8. A tilting table for a CRT terminal including:
  (a) a table top for supporting the CRT terminal, the table top having a bottom side,
  (b) an upper U-shaped bracket attached to the bottom side of the table top, the upper bracket having depending sidewalls, (c) a lower U-shaped bracket having upstanding sidewalls disposed adjacent the sidewalls of the upper bracket, the sidewalls of the lower bracket being provided with a pair of opposed side substantially horizontal slots and with a pair of opposed side angle slots, the angle slots including a plurality of notches, (d) pins carried by the sidewalls of the upper bracket and slidably engaging the lower bracket in the slots for supporting the upper bracket and table top, the pins engaging the angle slots in selected notches corresponding to predetermined angles of inclination of the table top from zero to substantially five degrees from horizontal for tilting the CRT terminal, (e) a base, and (f) bearing means carried by the base and connected to the lower U-bracket for rotatively supporting the table top by the base for allowing selective rotation of the table top and CRT terminal.

9. A tilting table comprising:

(a) a table top, (b) a base (c) a U-shaped upper bracket connected to the table top, (d) a U-shaped lower bracket connected to the base, (e) means adjustably interconnecting the said brackets for selectively adjustably supporting the table top, the means including:

(1) a pair of opposed side substantially horizontal slots, and a pair of opposed side angle slots, the angle slots each having a notched margin, the horizontal and angle slots being located in one of the brackets, and (2) side pins, carried by the other of said brackets, selectively engaging the horizontal slots and notches of the angle slots for retaining the table top in a preselected tilted position, and (f) one of the brackets is received within the other of the brackets, with the pins slidably extending from their bracket and through the slots of the bracket having the slots.

10. A tilting table comprising:

(a) table top means, (b) base support means for supporting the table top means, (c) one of said means including a pair of opposed side substantially horizontal slots, (d) one of said means including a pair of opposed side angle slots having a margin including a plurality of spaced notches, the angle slots being located at an angle relative to the horizontal slots, and (e) opposed side pin means carried by the others of said means, and engaging in bearing relation the first said one means in the substantially horizontal slots and engaging in bearing relation the second said one means in the angle slots for interconnecting the table top means and for supporting the table top means.

* * * * *